United States Patent
Tanabe (10) Patent No.: US 6,646,382 B2
(45) Date of Patent: Nov. 11, 2003

(54) MICROMINIATURE MICROWAVE ELECTRON SOURCE

(75) Inventor: Eiji Tanabe, Kawasaki (JP)

(73) Assignee: AET Japan, Inc., Kanagawa (JP)

( * ) Notice: Subject to any disclaimer, the term of this patent is extended or adjusted under 35 U.S.C. 154(b) by 0 days.

(21) Appl. No.: 10/080,658

(22) Filed: Feb. 25, 2002

(65) Prior Publication Data

US 2003/0052612 A1 Mar. 20, 2003

(30) Foreign Application Priority Data

Sep. 19, 2001  (JP) .................................... 2001-285675

(51) Int. Cl.[7] ................................................ H01J 25/02
(52) U.S. Cl. ............................................ 315/5; 315/5.34
(58) Field of Search ........................ 315/5, 5.29, 5.34, 315/5.37, 5.35, 3, 4, 39; 313/293

(56) References Cited

U.S. PATENT DOCUMENTS 3,963,955 A * 6/1976 Miram et al. ............. 315/5.34
4,398,121 A * 8/1983 Chodorow et al. ............. 315/4
4,527,091 A * 7/1985 Preist ............................. 315/5

* cited by examiner

Primary Examiner—Don Wong
Assistant Examiner—Wilson Lee
(74) Attorney, Agent, or Firm—Venable; Norman N. Kunitz (57) ABSTRACT

A microminiature microwave electron source excited by a pulsed microwave power through a coaxial to emit electrons includes an electrically conductive chamber that is connected to an external conductor of the coaxial cable at an openings end thereof and has an opening anode in a bottom portion thereof, a central conductor adjacent to the electron source, the central conductor having one end thereof connected to a central conductor of the coaxial cable, a carbon nanotube cold cathode formed on the other end thereof being supported by the chamber such that the cold cathode opposes the anode, a coupling iris that airtightly and fixedly supports the central conductor at an opening end of the chamber, and a connecting device for electrically and mechanically connecting the opening end of the chamber to the central conductor of the coaxial cable so as to connect the central of the electron source to the central conductor of the coaxial cable.

12 Claims, 6 Drawing Sheets

MICROMINIATURE MICROWAVE ELECTRON SOURCE

BACKGROUND OF THE INVENTION

1. Field of the Invention

The present invention relates to a microminiature electron source having a vacuum chamber for emitting electrons, the vacuum chamber being disposed at the distal end of a flexible coaxial cable. The microminiature electron source in accordance with the present invention is capable of instantly supplying high peak pulsed power to generate electrons. Because of this feature, the microminiature electron source finds extensive use in the field of medical diagnoses and treatment, including treatment of coronary restenosis, intravascular radiotherapy and cancer therapy, the industrial field, including nondestructive inspection and electron beam irradiation, the field of researches, and the field of microwave electron tubes.

2. Description of the Related Art

Currently, it is said that there are more than 500,000 patients requiring radiotherapy and radiation treatment in the world a year. As a radiation source having a diameter of 2 mm or less, a gamma ray source of cesium or iridium, or a needle or a rod filled with a liquid containing radioactive substance is nowadays being used for medical treatment. The conventional radiotherapy places heavy burdens on both patients and the persons involved in medical treatment. The radiation source employing the radioactive substance constantly emits radioactive rays. Hence, during a preparatory step implemented to locate an affected area of a patient body to be irradiated, a non-affected area will be inevitably irradiated before the patient is subjected to actual medical treatment. This means that extremely complicated handling and high risk have been always involved in the medical treatment, thus further burdening doctors. Accordingly, there have been demands for the development of a small electron medical treatment system that provides high medical treatment effect, causes less burdens on patients, and requires lower total cost.

There has been proposed a pulse X-ray generator using a coaxial line, an electrode, and a target for emitting electrons, although it is not intended for medical treatment (Japanese Examined Patent Application Publication No. 60-20865). The X-ray generator having the coaxial cable uses an inert gas, such as helium, charged in the space between a cold cathode and the target that emits X rays. However, a very small quantity of oxygen gas ions or the like, which are impurities, contained in the inert gas severely collide against the cold cathode, adversely affecting the durability of the cold cathode. Furthermore, since it is not designed for medical treatment, it is bulky as a whole, making it impossible to use it as a radiation source for medical treatment by inserting it into blood vessels, lumens of a body, or tubes.

The inventor has proposed a microminiature X-ray generator (Japanese Patent No. 3090910), which has been achieved by further reducing the size of the foregoing pulse X-ray generator and which generates X rays under the application of high-voltage pulses. The microminiature X-ray generator is considerably advantageous in that no high voltage is applied to generate X rays until an X-ray generating unit is set and ready, thus making it possible to avoid unwanted irradiation to non-affected tissues of a patient body or medical personals involve the treatment.

SUMMARY OF THE INVENTION

Accordingly, it is an object of the present invention to improve an electron source used with the foregoing microminiature X-ray generator so as to provide a microminiature microwave electron source that features greater ease of operation and finds further expanded application fields.

In order to achieve the above objections, a microminiature microwave electron source excited by a pulsed microwave power through a coaxial cable to emit electrons according to the present invention includes an electrically conductive cylindrical chamber that is connected to an external conductor of the coaxial cable, and has an opening anode in a bottom portion thereof; a central conductor that has one end thereof connected to a central conductor of the coaxial cable, a cathode formed on the other end thereof being supported by the chamber such that the cathode opposes the anode; and connecting means for electrically and mechanically connecting a chamber assembly comprising a resonator constituted by the chamber and the central conductor with the coaxial cable.

In the microminiature microwave electron source according to the present invention, the cathode is an electric field radiating cold cathode.

In the microminiature microwave electron source according to the present invention, the cold cathode is formed using a carbon nanotube.

In the microminiature microwave electron source according to the present invention, the carbon nanotube is disposed at the center of a distal end of the central conductor, and surrounded by a Welnelt electrode.

In the microminiature microwave electron source according to the present invention, the chamber operates as a resonator of $(4/\lambda)(2n+1)$ with respect to a microwave.

In the microminiature microwave electron source according to the present invention, the connecting means removably connects the coaxial cable and the chamber by a screw or sliding sleeve fit.

In the microminiature microwave electron source according to the present invention, a flange is provided at a proximal portion of the central conductor in the chamber, and the flange is secured to the chamber through the intermediary of a coupling iris and constitutes an impedance converter for matching a line impedance of the coaxial cable and an impedance of the resonator of the chamber.

In the microminiature microwave electron source according to the present invention, the opening anode of the chamber assembly has a hermetic window that allows an electron beam to pass therethrough so as to directly irradiate a target by the electrons that have passed through the hermetic window.

In the microminiature microwave electron source according to the present invention, the opening anode of the chamber assembly is connected to another vessel having vacuum space.

In the microminiature microwave electron source according to the present invention, the vacuum space of another vessel is connected to the opening anode of the chamber assembly through the intermediary of a beam collimator.

In the microminiature microwave electron source according to the present invention, another vessel having the vacuum space is an electrode vessel of an RF gun, a linear accelerator, a TWT or a klystron.

In the microminiature microwave electron source according to the present invention, the vacuum space of another vessel is an X-ray generating chamber, comprising an X-ray target, which opposes the anode opening, and an X-ray radiation window, thus making the microminiature microwave electron source applicable for radiating X rays.

In the microminiature microwave electron source according to the present invention, the microminiature microwave electron source is a microminiature X-ray source intermittently driven by microwave bursts.

DESCRIPTION OF THE PREFERRED EMBODIMENTS

An embodiment of a microminiature microwave electron source in accordance with the present invention will be described primarily with reference to the accompanying drawings.

Figure 1:
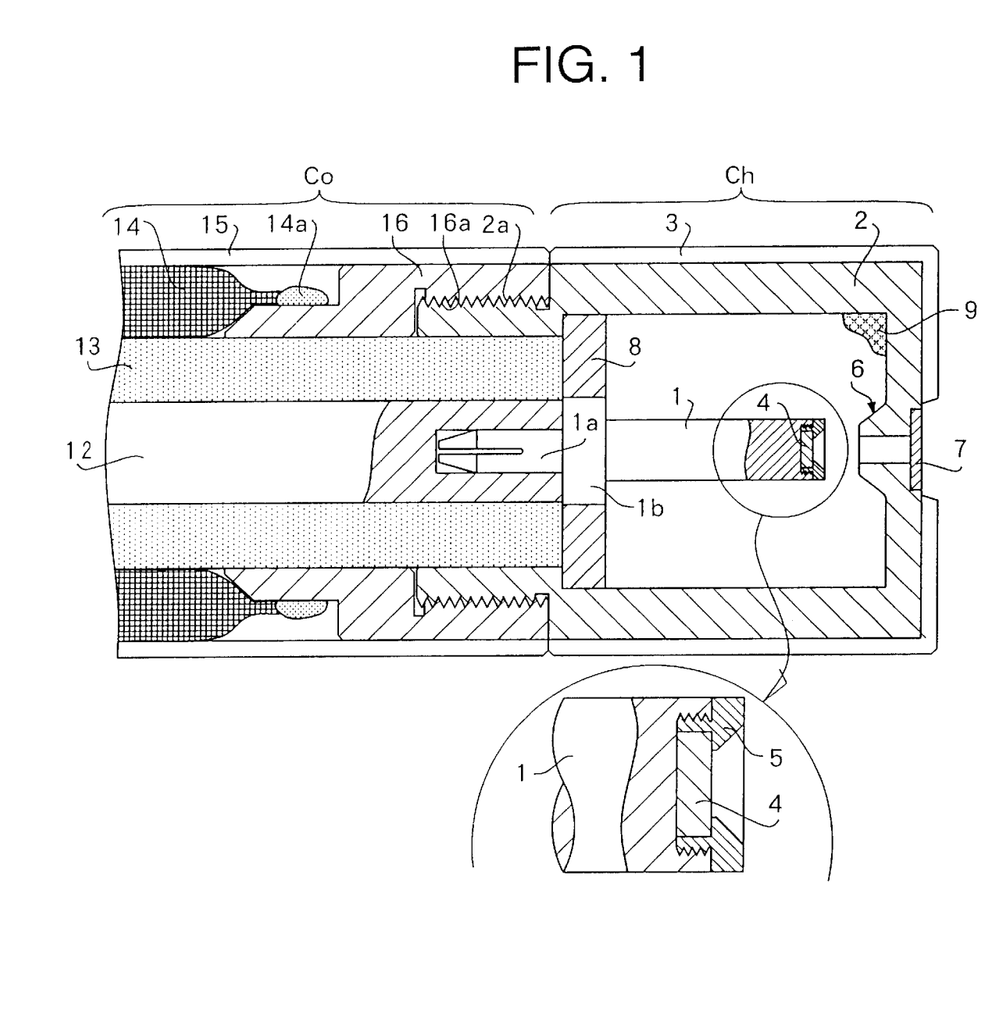
FIG. 1 is a sectional view illustrating a chamber and a coaxial cable of a microminiature electron source in accordance with an embodiment of the present invention.
Figure 2:
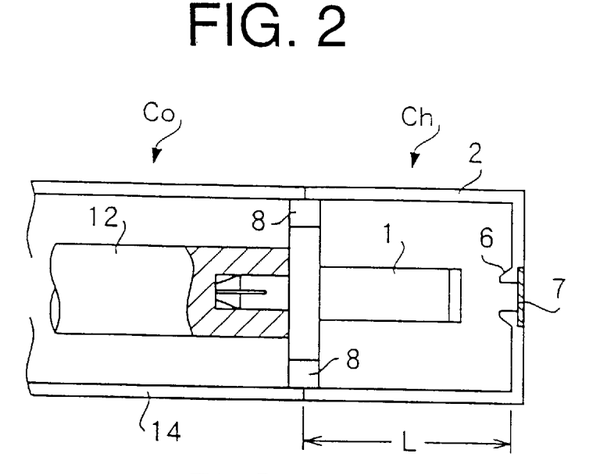
FIG. 2 is a schematic construction diagram showing the microminiature electron source.

FIG. 1 is an enlarged sectional view illustrating a microminiature electron source in accordance with an embodiment of the present invention. A chamber assembly Ch is in connection with a coaxial assembly Co. The microminiature electron source emits electrons excited by microwaves supplied from a driving circuit through a coaxial cable. A chamber 2 has substantially the same diameter as that of an external conductor 14 of the coaxial cable. The chamber assembly Ch is detachably connected to the distal end of the coaxial cable through the intermediary of a connecting device.

The chamber 2 is electrically conductive and cylindrically shaped, having an opening at the center of its bottom (distal end). The neighborhood area of the opening projects into the cylindrical cavity to form an anode 6. A window 7 formed of titanium or silicone is provided on the outer side of the opening. The window 7 maintains the vacuum inside the chamber and transmits electrons. A carbon nanotube 4 constituting a cold cathode is provided at the distal end of a central conductor 1 disposed at the center of the chamber 2. The periphery of the carbon nanotube 4 is provided with a Welnelt electrode 5. A technology available for growing a carbon nanotube on a metal is used to grow the carbon nanotube at the distal end portion of the central conductor 1 in this embodiment.

In the embodiment, the Welnelt electrode 5 is secured to the central conductor 1 and maintained at the same potential as that of the cold cathode 4. The proximal end of the central conductor 1 is provided with a flange 1b and a connecting pin 1a that is split at the distal end thereof. The central conductor 1 is supported at the center of the chamber 2 by a coupling iris 8 through the intermediary of the flange 1b. A getter 9 forming a part of a coaxial resonator is disposed in the space in the chamber to maintain a vacuum.

The chamber 2 has a coupling screw 2a at the opening end. The coupling end of the coaxial cable is provided with a connecting ring 16, and a coupling female screw 16a is disposed at the distal end of the connecting ring 16, an external conductor 14 being coupled to the connecting ring 16. Furthermore, a coupling hole is formed at the distal end of a central conductor 12 of the coaxial cable. An internal insulator 13 of the cable uses a foamy Teflon (PTFE) insulating material to maintain high performance against large power and high frequencies.

The coupling pin 1a of the central conductor 1 of the chamber assembly Ch is aligned to the connecting hole at the distal end of the central conductor 12 of the coaxial assembly Co. At the opening end of the chamber assembly Ch, the coupling screw 2a is attached to the coupling female screw 16a of the connecting ring 16 of the coaxial assembly Co so as to join the chamber assembly Ch and the coaxial assembly Co into one piece. The external surfaces of the chamber 2 and the coaxial assembly Co are covered with films 3 and 15, respectively, formed of an electrical insulant.

Referring now to FIG. 2 through FIG. 5, the electrical operation of the microminiature X-ray source will be described.

Figure 3:
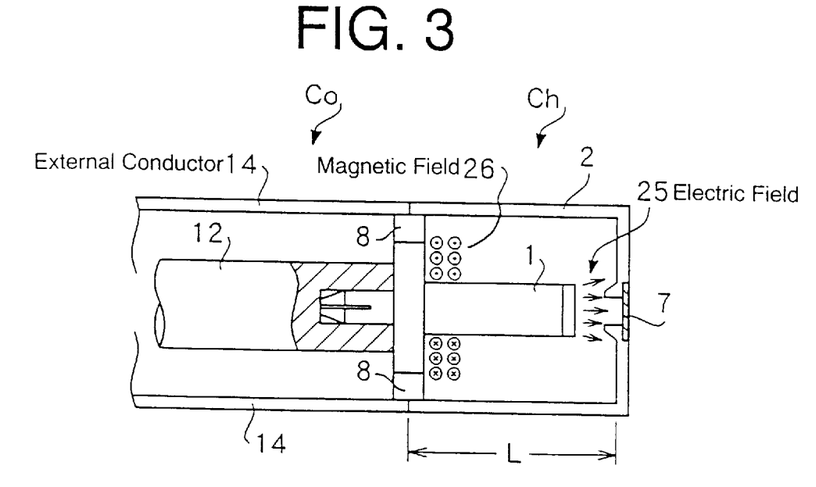
FIG. 3 is a schematic diagram illustrating the distribution of an electromagnetic field in the chamber of the microminiature electron source.
Figure 4:
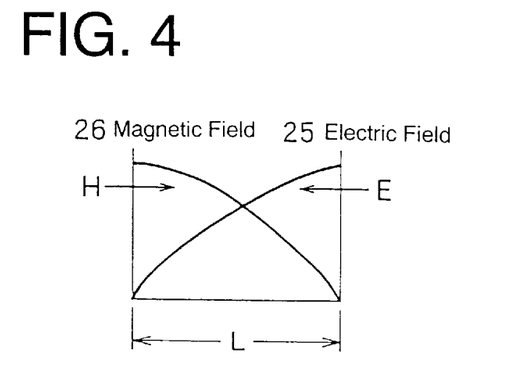
FIG. 4 is a graph showing the distribution of the intensity of the electromagnetic field in a cavity of the microminiature electron source.

The microminiature transmission line constructed of the coaxial assembly Co used in the present invention is electrically coupled to the chamber 2 and the central conductor 1 of the chamber assembly Ch through the intermediary of a coupling iris 8 formed of a glass or ceramic constituent. FIG. 3 is a schematic diagram illustrating the electromagnetic field in the chamber assembly in accordance with the present invention. FIG. 4 is a graph showing the distribution of a cavity electromagnetic field in the chamber assembly. The circuit of the chamber 2 constitutes a resonance circuit for microwaves. If the wavelength of a microwaves is denoted as $\lambda$, then the length of the chamber will be substantially $L=\lambda/4$. As shown in FIG. 3, the distribution of the electromagnetic field of microwaves in the chamber is such that an electric field (E) 25 is generated from the central conductor 1 of the chamber 2 toward the surface of the external conductor 14, and a magnetic field (H) 26 is generated around the axis of the central conductor 1 in the chamber at the chamber end of the glass or ceramic wall. Referring to FIG. 4, the intensity distribution of the electric field (E) 25 is such that the intensity grows higher toward the right of the chamber as observed facing the drawing, while the intensity distribution of the magnetic field (H) 26 grows higher toward the left. To produce electrons by the cold cathode, microwave power is used to produce a high voltage of about 50 kV to about 100 kV between a cold cathode 4 and the anode 6.

Figure 5:
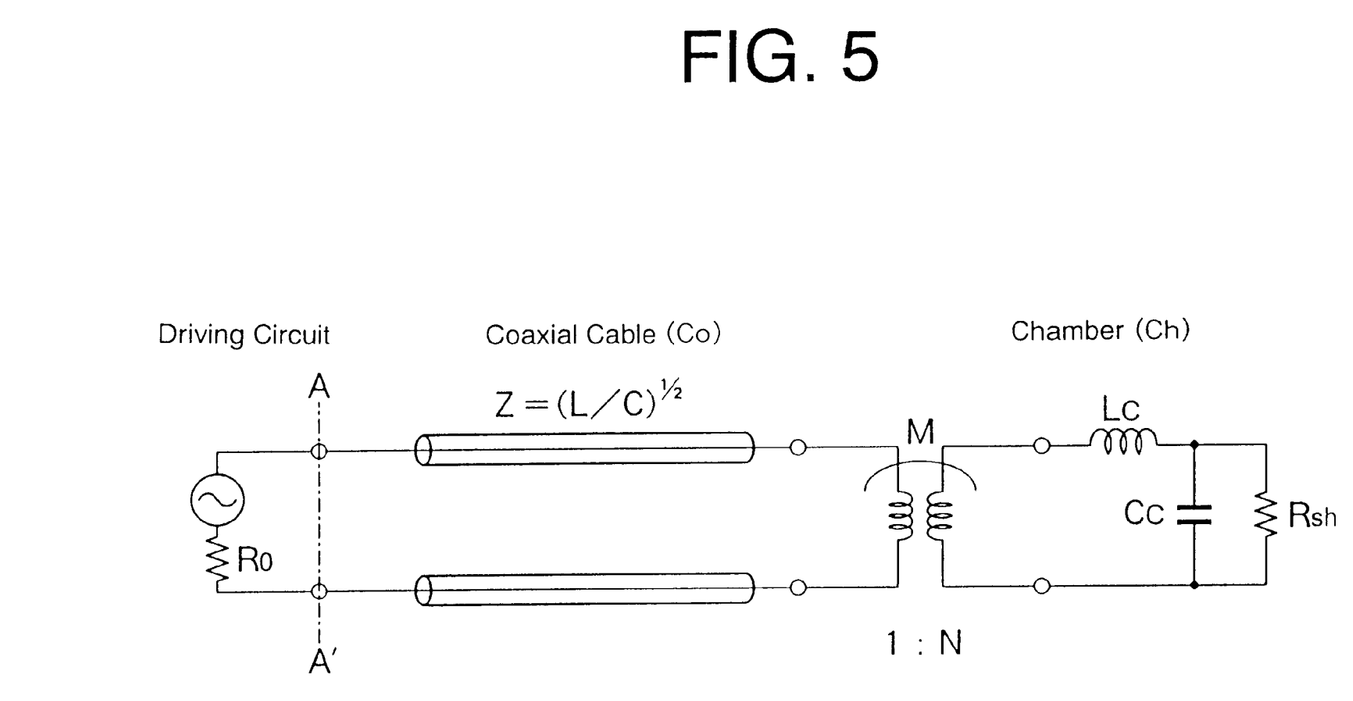
FIG. 5 is a diagram showing an equivalent circuit of the chamber of a transmission line of the microminiature electron source.

FIG. 5 is an equivalent circuit for the transmission line or the coaxial cable and the chamber of the microminiature electron source in accordance with the present invention. The equivalent circuit is a distributed constant circuit wherein an impedance Z of the coaxial cable of the coaxial cable assembly Co is given by $(L/C)^{1/2}$. In this embodiment, the impedance Z is set to 50Ω. The inner diameter portion of the coupling iris 8 formed of the glass or ceramic wall and the stepped portion of the flange 1b provided on the central conductor 1 in the chamber (see FIG. 1) make up a microwave impedance transformer. The equivalent circuit is represented by a boosting transformer of 1:N. The equivalent circuit in the chamber will be a resonance circuit composed of Lc and Cc, and the equivalent shunt impedance of the circuit is denoted by Rsh. The equivalent shunt impedance Rsh is related to a loss of the resonance circuit. It is necessary to set the impedance Rsh output from a power amplifying circuit so that it coincides with the impedance $Z=(L/C)^{1/2}$ of a transmission circuit so as to efficiently transmit the power-amplified output power of a microwave oscillator to the transmission circuit.

The size of an iris is adjusted by the coupling iris 8 so as to adjust a value of the external Q of the coaxial assembly $Qco=\omega U/Pco$, where Pco denotes the loss of a driver including the coaxial assembly, and U denotes stored energy in the chamber. Thus, all energy from the coaxial assembly can be supplied to the chamber or the resonator without reflection. In other words, the iris functions to adjust a mutual inductance M of coupling (see FIG. 5) so as to make the impedance of a power supply coincide with the impedance of a load.

Figure 6:
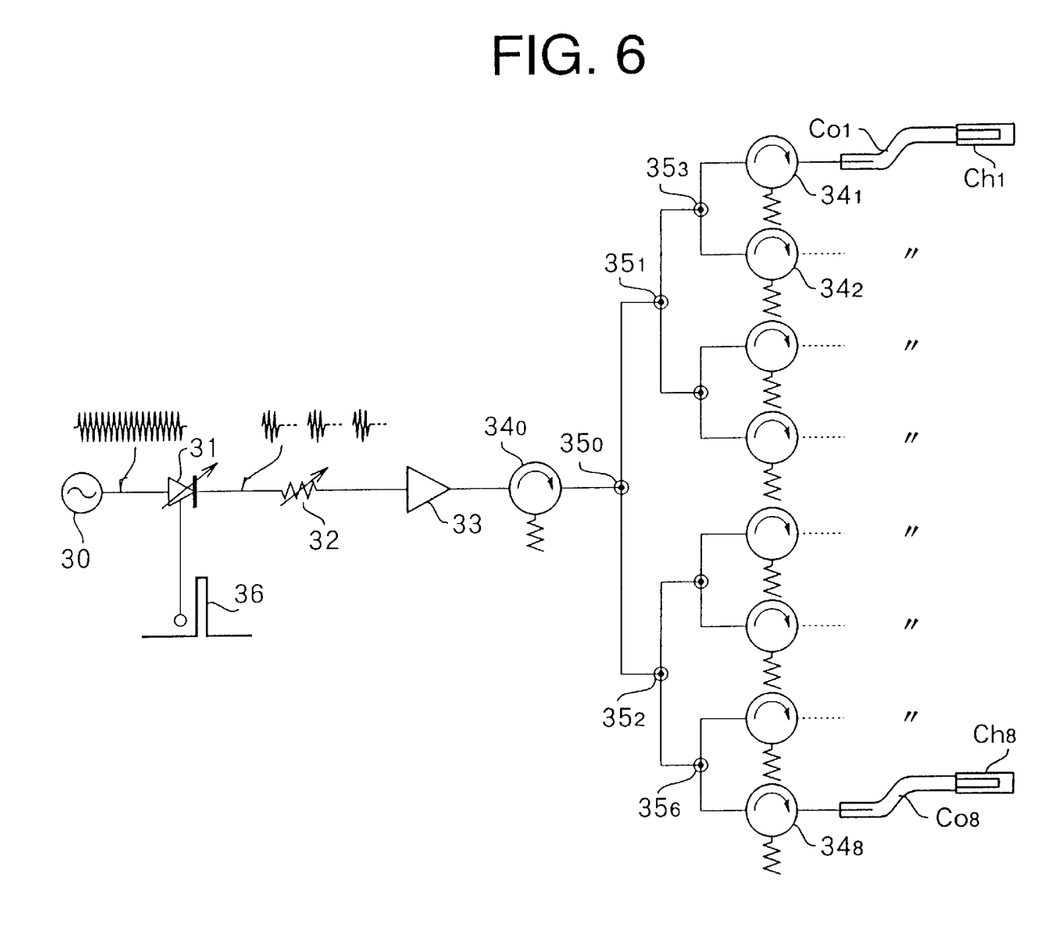
FIG. 6 is a circuit diagram showing a driving circuit of a microminiature electron source in accordance with the present invention.

FIG. 6 is a circuit diagram of a driving circuit of a microminiature electron source in accordance with the present invention.

The oscillating frequencies of a microwave oscillator 30 range from 3 to several tens of GHz. Preferably, higher frequencies are selected to make the apparatus smaller and also to increase the resistance to electric power. Use of microwaves provides an advantage in that high-voltage, high electric power can be transmitted by a smaller system without causing voltage breakdown of a dielectric of a transmission cable. Microwaves are modulated by a PIN diode modulator 31 using a pulse signal 36 for a modulator of 100 nsec to 1 μsec. In this way, successive microwave signals are converted into microwave signals that have been subjected to pulse modulation by the pulse signals. The pulse modulation permits accurate control of an average output of electron beams. The number of repetitions of the modulation pulse signals 36 is set to several hundreds of pulses per second. The modulated microwave signals are connected to branching filters $35_0$ to $35_6$ in three stages through the intermediary of a variable attenuator 32, an amplifier 33, and a circulator $34_0$. The outputs of branching filters $35_3$ through $35_6$ in the last stage are connected to chamber assemblies $Ch_1$ through $Ch_8$ through the intermediary of circulators $34_1$ through $34_8$ and coaxial cables $Co_1$ through $Co_8$, and emitted in the form of electron beams. Electric power is connected to microminiature microwave electron sources through the intermediary of the circulators $34_1$ through $34_8$, thus allowing the microminiature microwave electron sources to stably operate without being affected by other output load conditions.

In the present invention, the chamber 2 constitutes a hollow resonator. The shunt impedance of the hollow resonator is approximately 0.2 MΩ at an exciting frequency of 3 GHz. Therefore, an electron beam of about 100 kV power can be generated for a 50 kW input peak power.

The shunt impedance Rsh can be given by:

$$Rsh=(60\pi/\delta\lambda)[4l^2(\ln(r_2/r_1))^2]/[2\ln(r_2/r_1)+1(1/r_1+1/r_2)]$$

where δ: Skin effect thickness
λ: Wavelength of microwave
l: Length of chamber
$r_1$: Inner radius of central conductor
$r_2$: Inner diameter of chamber
g: Length of gap (Distance from the distal end of the central conductor to the anode)

If gap length g is sufficiently smaller than chamber length l, then g may be ignored, as shown in the above expression.

If the voltage of a microwave signal applied between the anode 6 and the cold cathode 4 is set to several hundreds of kilovolts, then the instantaneous power (peak power), which is represented by $P=V^2/Rsh$, will be approximately 50 kW. If the width of a modulation pulse is set to 1 μsec and a pulse repetition cycle is set to 100 pulses per second, then the workload (W*SEC) will be approximately 5W*SEC. Thus, the instantaneous power makes it possible to generate an extremely powerful electron beam. A temperature rise in the chamber, however, is minimized because the workload per second is relatively small due to the intermittent operation of an electron gun by microwave bursts.

Figure 7:
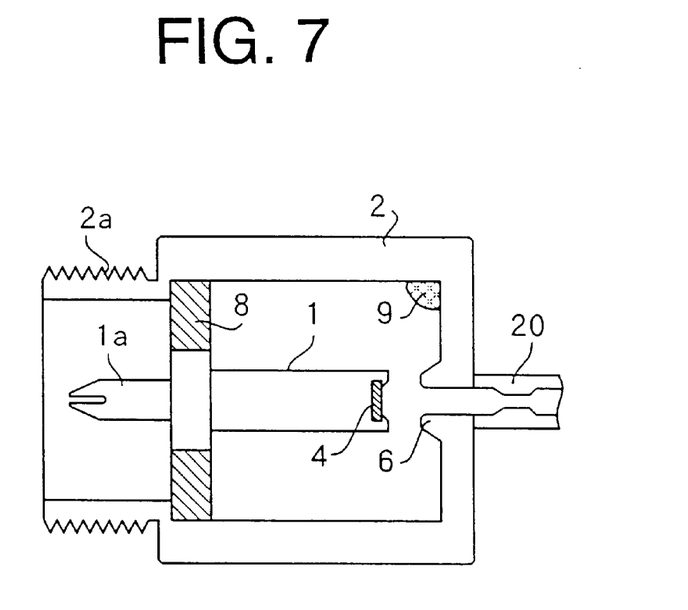
FIG. 7 is an enlarged sectional view showing a chamber of a microminiature electron source equipped with a collimator in accordance with an embodiment of the present invention.

FIG. 7 is an enlarged sectional view illustrating a chamber of a microminiature electron source equipped with a collimator according to an embodiment of the present invention. This embodiment does not have the window 7 for electron beams of the embodiment shown in FIG. 1, while it has a collimator 20 whose one end is connected to the anode 6. Like reference numerals will be assigned to like components as those of the embodiment set forth above, and the descriptions thereof will be omitted. The other end of the collimator 20 is connected to a vacuum vessel, such as a microwave electron tube. The chamber is used as the electron source of such an electron tube to supply collimated electron streams.

Figure 8:
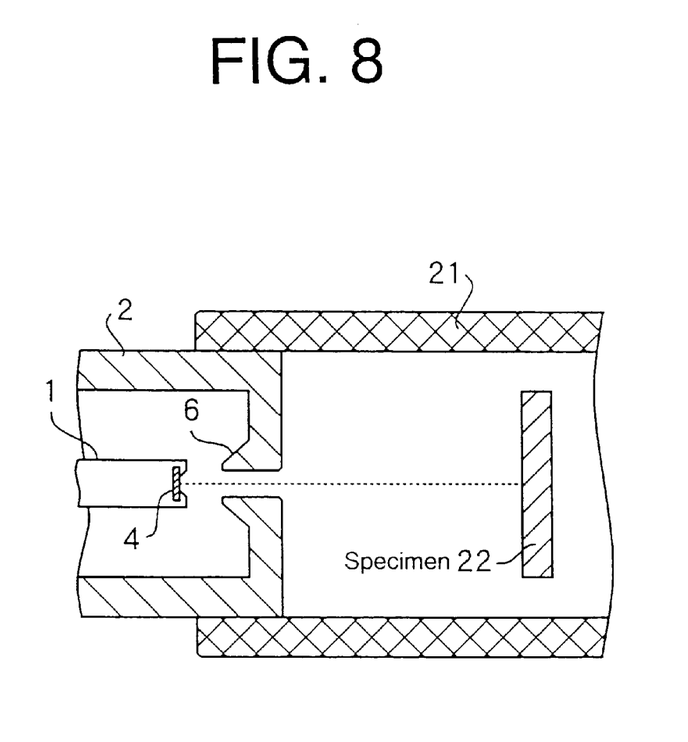
FIG. 8 is an enlarged sectional view showing a microminiature electron source in accordance with an embodiment of the present invention that is coupled to another vacuum specimen chamber.

FIG. 8 is an enlarged sectional view showing a microminiature electron source according to an embodiment of the present invention that is coupled to another vacuum chamber 21. As in the case of the embodiment shown in FIG. 7, this embodiment does not have the window for emitting electron beams. In the vacuum chamber 21, a specimen 22 is disposed. Electron beams are applied to the specimen 22 mainly to study the material, the physical properties, and the chemical properties of the specimen.

Figure 9:
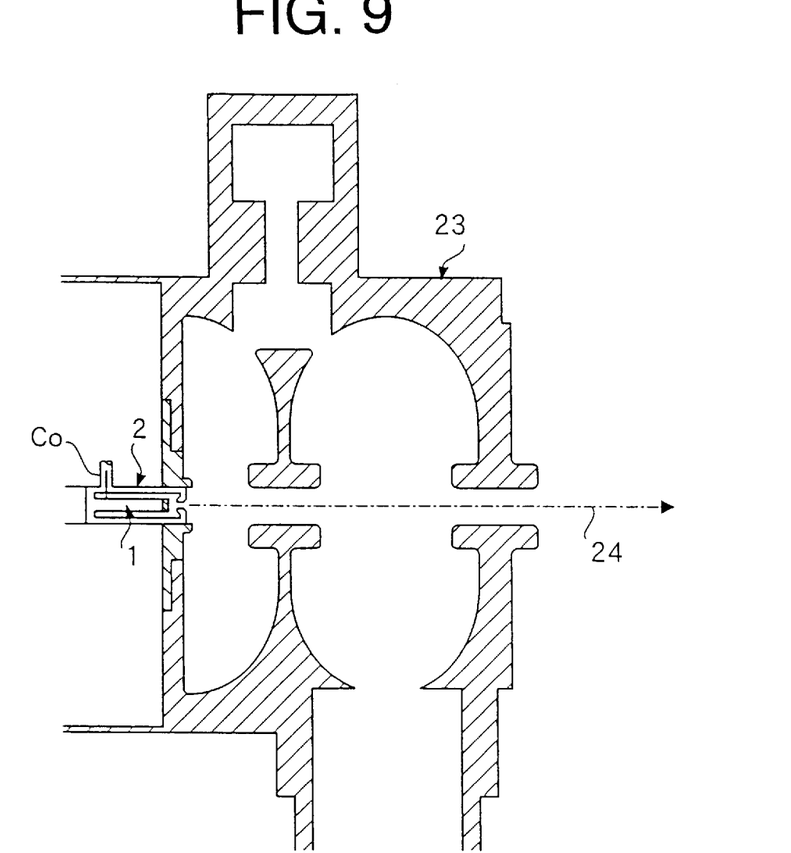
FIG. 9 is an enlarged sectional view showing a microminiature electron source in accordance with an embodiment of the present invention that is coupled to a microwave cavity of an RE gun.

FIG. 9 is an enlarged sectional view showing a microminiature electron source according to an embodiment of the present invention that is coupled to a microwave cavity of an RF gun. A chamber 2 of the microminiature microwave electron source in accordance with the present invention is hermetically fixed at an electron receiving opening of the RF gun. Microwave energy is supplied to the chamber 2 through a coaxial cable Co. The electrons emitted from a cathode at the distal end of a central conductor 1 turn into a further accelerated bunch beam 24. The chamber 2 functions as a cavity of λ/4 with respect to microwaves. With this arrangement, the cathode in the chamber is effectively protected against back bombardments by adjusting the distance of chamber 2 and RF gun cavity 23. The microminiature microwave electron source in accordance with the present invention can be used as the electron source for other microwave electron tubes, such as a klystron, an accelerator, and a TWT, in addition to the RF gun mentioned above. In these microwave electron tubes also, the cathode will be protected from back bombardments while providing bunched electron beams to microwave electron tubes.

Figure 10:
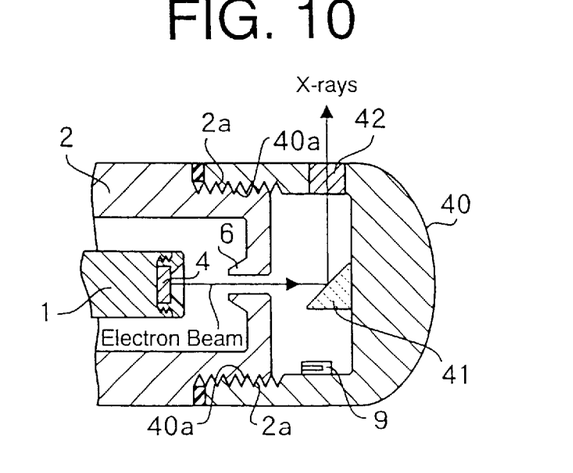
FIG. 10 is an enlarged sectional view showing a microminiature electron source for generating X rays in accordance with an embodiment of the present invention that is coupled to an X-ray generating dome.

FIG. 10 is an enlarged sectional view showing a microminiature electron source for generating X rays according to an embodiment of the present invention. The microminiature electron source is coupled to an X-ray generating dome. An accelerated electron beam that has passed through an anode 6 hits an X-ray target 41 supported by an X-ray generating dome 40 serves for cooling target 41, so as to produce X rays, and the produced X rays are released to the outside through an X-ray window 42. The microminiature electron source is connected to the X-ray generating dome 40 by attaching a screw 2a provided on the outer periphery of the distal end of a chamber 2 to a coupling screw 40a. The microminiature X-ray source thus assembled is used as an X-ray source for intravascular radiotherapy or as a small radiation source for cancer therapy. The microminiature X-ray generating source and a cable can be detachably connected by a screw or the like, as shown in FIG. 1.

As explained in detail above, the microminiature electron source in accordance with the present invention has the outside diameter of its cylindrical chamber at the distal end thereof substantially set to be the same as that of the external conductor of the coaxial cable. With this arrangement, it is possible to form the microminiature electron source to be extremely thin (e.g., about 2 mm), allowing it suitably used for irradiating electrons or generating X rays in the field of medical treatment. The microminiature X-ray generating source is used as an X-ray source for intravascular radiotherapy or as a small radiation source for cancer therapy.

Furthermore, the microminiature electron source can be coupled to another vacuum vessel to be used as a linear electron source for industrial or analytical applications. The microminiature electron source can be also used as an electron source for a microwave electronic tube, such as a klystron, a linear accelerator, or TWT.

In addition, the electron source in accordance with the present invention can be used as an electron source for an accelerator for research applications. Especially when the electron source is used with an RF gun, the chances of the back bombardment of electronic beams against a cathode can be minimized. The microminiature electron source or a microminiature X-ray source can be removably connected to a cable by using a screw or the like, permitting easy maintenance or the like of consumable microminiature X-ray generating sources.

A variety of modifications of the embodiments explained in detail above are possible within the scope of the present invention. As a preferred embodiment of a cathode, the cold cathode electric field radiating carbon nanotube has been described; however, another cathode conventionally used may be applied. The example has been shown wherein the X-ray dome is detachably connected to the chamber assembly of the microminiature microwave electron source in accordance with the present invention; alternatively however, the space containing an X-ray target may be combined with the chamber assembly into one piece.

What is claimed is:

1. A microminiature microwave electron source excited by a pulsed microwave power through a coaxial cable to emit electrons, comprising:

an electrically conductive cylindrical chamber that is connected to an external conductor of the coaxial cable, and has an opening anode in a bottom portion thereof;

a central conductor that has one end thereof to be connected to a center conductor of the coaxial cable, and that has an electric field radiating cold cathode formed on the other end thereof, with the central conductor being supported by the chamber such that the cathode opposes the anode; and connecting means for electrically and mechanically connecting a chamber assembly comprising a resonator constituted by the chamber and the central conductor with the coaxial cable.

2. A microminiature microwave electron source according to claim 1, wherein the cold cathode is formed using a carbon nanotube.

3. A microminiature microwave electron source according to claim 2, wherein the carbon nanotube is disposed at the center of a distal end of the central conductor, and surrounded by a Welnelt electrode.

4. A microminiature microwave electron source according to claim 1, wherein the chamber operates as a resonator of $(4/\lambda)(2n+1)$ with respect to a microwave.

5. A microminiature microwave electron source according to claim 1, wherein the connecting means removably connects the coaxial cable and the chamber by a screw.

6. A microminiature microwave electron source according to claim 1, wherein a flange is provided at a proximal portion of the central conductor in the chamber, and the flange is secured to the chamber through the intermediary of a coupling iris and constitutes an impedance converter for matching a line impedance of the coaxial cable and an impedance of the resonator of the chamber.

7. A microminiature microwave electron source according to claim 1, wherein the opening anode of the chamber assembly has a hermetic window that allows an electron beam to pass therethrough so as to directly irradiate a target by the electrons that have passed through the hermetic window.

8. A microminiature microwave electron source according to claim 1, wherein the opening anode of the chamber assembly is connected to another vessel having a vacuum space.

9. A microminiature microwave electron source according to claim 8, wherein the vacuum space of the another vessel is connected to the opening anode of the chamber assembly through the intermediary of a beam collimator.

10. A microminiature microwave electron source according to claim 8, wherein the another vessel having the vacuum space is an electrode vessel of an RF gun, a linear accelerator, a TWT, or a klystron.

11. A microminiature microwave electron source according to claim 8, wherein the vacuum space of another vessel is an X-ray generating chamber, comprising an ray target, which opposes the anode opening, and an X-ray radiation window, thus making the microminiature microwave electron source applicable for radiating X rays.

12. A microminiature microwave electron source according to claim 1, wherein the microminiature microwave electron source is a microminiature X-ray source intermittently driven by microwave bursts.

* * * * *